No. 730,119. Patented June 2, 1903.

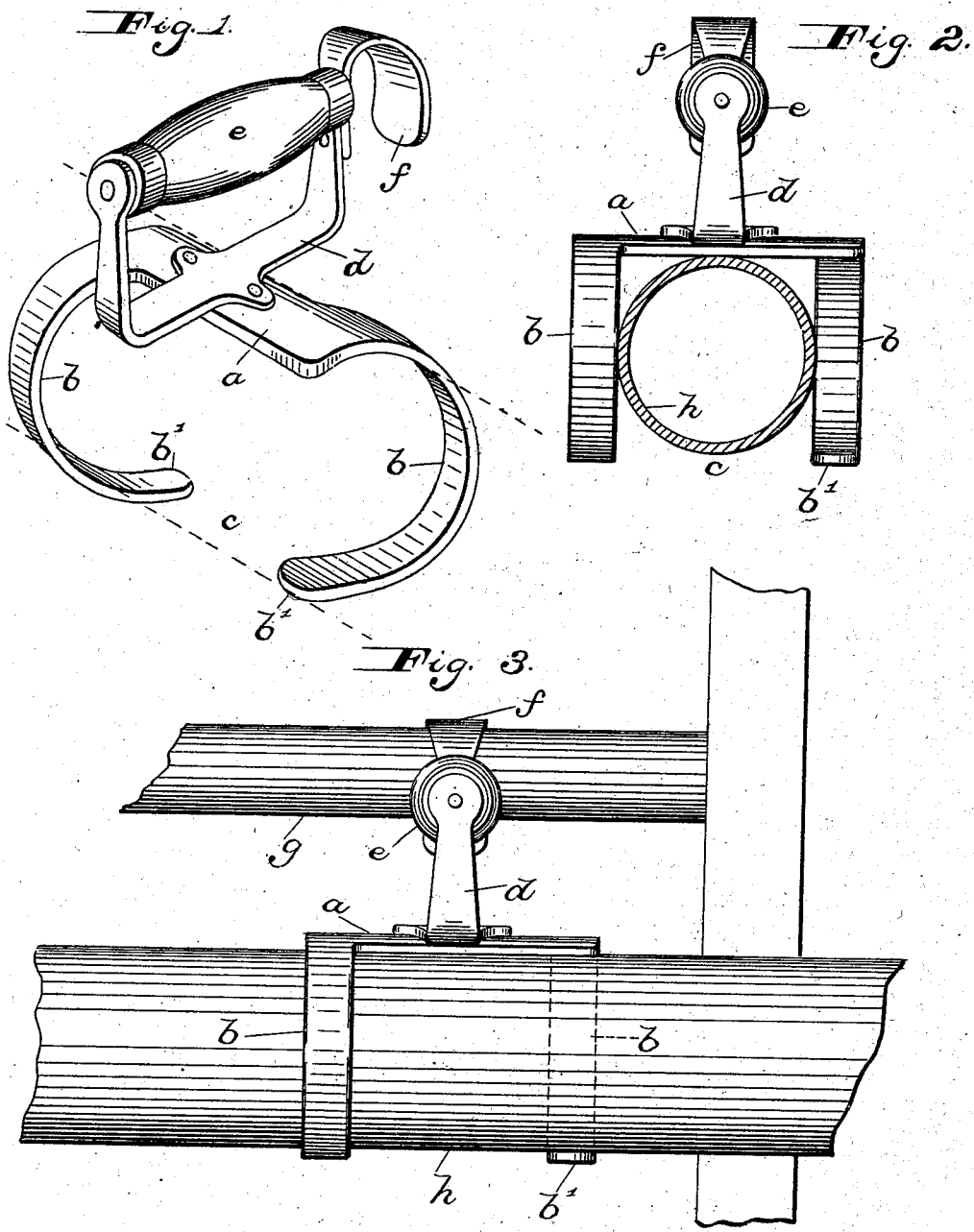

UNITED STATES PATENT OFFICE.

CHARLES HANSON AND JOHN H. ADAMS, OF BALTIMORE, MARYLAND.

HOSE-SPANNER.

SPECIFICATION forming part of Letters Patent No. 730,119, dated June 2, 1903.

Application filed August 21, 1902. Serial No. 120,443. (No model.)

*To all whom it may concern:*

Be it known that we, CHARLES HANSON and JOHN H. ADAMS, citizens of the United States, residing at Baltimore, State of Maryland, have invented certain new and useful Improvements in Hose-Spanners, of which the following is a specification.

This invention relates to improvements in hose-spanners or hooks used by firemen or others in carrying hose from one place to another.

The object of the invention is to provide an improved device of this character which can be readily manipulated by one hand to securely grasp the hose and which has no movable parts to wear out or get out of order, but is of simple and durable construction.

The invention consists of certain constructions and arrangements of parts hereinafter described and claimed, reference being had to the accompanying drawings, in which—

Figure 1 is a perspective view of the improved hose-spanner, the hose being indicated by dotted lines. Fig. 2 is a side view of the hose-spanner and a cross-section of hose, said view illustrating the initial relative positions of the spanner and hose necessary in order that the former may grasp the latter. Fig. 3 is a side elevation illustrating the spanner suspending the hose from the rung of a ladder.

The hose-spanner as illustrated in the drawings comprises a bar $a$, provided at its ends with transversely-extending reversed hooks $b$, which are rigid and whose ends $b'$ point toward the longitudinal axis of the spanner and are spaced apart in a longitudinal direction, so as to leave a space $c$ between them. In the present instance the said ends overlap in a horizontal plane, as indicated in the drawings.

To the bar $a$ is rigidly secured the bracket $d$ of a loop-handle, said bracket having secured thereto a hand-grasp $e$ and also having rigidly secured to one of its side members a downwardly-turned suspension-hook $f$, by which the device may be attached to the rung $g$ of a ladder, as illustrated in Fig. 3.

In practice the operator grasps the spanner with one hand and inserts it downwardly over the hose $h$, as illustrated in Fig. 2—that is, with the bar $a$ extending transversely of the hose, which latter is received in the space $c$ between the two hooks $b$ and with the said two hooks extending lengthwise with respect to the hose. The operator then gives the spanner a quarter-turn, so that the two hooks will take under and partly around the hose, as illustrated in Figs. 1 and 3, whereupon the hose can be lifted in the hooks, which form a support therefor, and can be carried from place to place or up a ladder, as may be desired.

While the foregoing description refers to the invention as a "hose-spanner," it is obvious that the spanner may also be used to carry pipes, rods, logs, and other articles.

Having thus fully described our invention, what we claim as new, and desire to secure by Letters Patent, is—

1. A spanner device to be used for carrying hose, rods, and the like, comprising a bar, $a$, provided at its ends with transversely-extending reversed hooks, $b$, whose ends, $b'$, point toward the longitudinal axis of the device and overlap each other; a bracket, $d$, rigidly secured to said bar, $a$; and a hand-grasp, $e$, rigidly secured to the ends of said bracket, as and for the purpose set forth.

2. A spanner device to be used for carrying hose, rods, and the like, comprising a bar, $a$, provided at its ends with transversely-extending reversed hooks, $b$, whose ends, $b'$, point toward the longitudinal axis of the device and overlap each other; a bracket, $d$, rigidly secured to said bar, $a$; a hand-grasp rigidly secured between and to the ends of said bracket; and a downwardly-turned suspension-hook, $f$, rigidly secured to one end of said bracket, as and for the purpose set forth.

In testimony whereof we affix our signatures in the presence of two witnesses.

CHARLES HANSON.
JOHN H. ADAMS.

Witnesses:
PHILIP S. EDWARDS,
FREDERICK S. STITT.